(12) United States Patent
Barrett et al.

(10) Patent No.: US 7,548,897 B2
(45) Date of Patent: Jun. 16, 2009

(54) MISSION-CENTRIC NETWORK DEFENSE SYSTEMS (MCNDS)

(75) Inventors: George R. Barrett, Silver Spring, MD (US); Susan C. Lee, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 1130 days.

(21) Appl. No.: 10/679,606

(22) Filed: Oct. 2, 2003

(65) Prior Publication Data

US 2004/0136378 A1    Jul. 15, 2004

Related U.S. Application Data

(60) Provisional application No. 60/415,437, filed on Oct. 2, 2002.

(51) Int. Cl.
  G06N 5/02        (2006.01)
  G06F 17/00      (2006.01)
(52) U.S. Cl. .................................. 706/50; 709/238
(58) Field of Classification Search .................. 706/50; 701/1; 709/238; 713/153
  See application file for complete search history.

(56) References Cited

U.S. PATENT DOCUMENTS

| 5,606,500 | A | * | 2/1997 | Tran ............................... 701/1 |
| 5,944,784 | A |   | 8/1999 | Simonoff et al. |
| 6,061,727 | A |   | 5/2000 | Simonoff et al. |
| 6,125,387 | A |   | 9/2000 | Simonoff et al. |
| 6,298,455 | B1 |  | 10/2001 | Knapman et al. |
| 6,532,554 | B1 |  | 3/2003 | Kakadia |
| 2002/0099672 | A1 | | 7/2002 | Ganesh |
| 2003/0084323 | A1 | | 5/2003 | Gales |
| 2003/0158963 | A1 | * | 8/2003 | Sturdy et al. ................. 709/238 |
| 2004/0002863 | A1 | * | 1/2004 | Nefian ......................... 704/256 |

OTHER PUBLICATIONS

Dr. Douglas C. Schmidt, et al., "Toward Adaptive and Reflective Middleware . . . ", The Journal of Defense Software Engineering, Nov. 2001, pp. 10-16.

* cited by examiner

Primary Examiner—David R Vincent
Assistant Examiner—Kalpana Bharadwaj
(74) Attorney, Agent, or Firm—Aisha Ahmad

(57) ABSTRACT

The Mission Centric Network Defense System (MCNDS) is a deployable network defense system that monitors network activities, generates and maintains situational awareness of operational activities, and uses this joint situational awareness of networked and operational activities to predict the mission impact of alterations and disruptions of networked resources. The MCNDS uses its predictive capability to rank information operation (IO) courses-of-action (COAs) and interpret network alarms and intrusion detections in terms of expected operational mission impact.

16 Claims, 5 Drawing Sheets

MISSION-CENTRIC NETWORK DEFENSE SYSTEMS (MCNDS)

CROSS-REFERENCE TO RELATED APPLICATIONS

This application claims the benefit of provisional U.S. application Ser. No. 60/415,437, filed on Oct. 2, 2002, the entire contents of which are hereby incorporated by reference as if fully disclosed herein.

BACKGROUND OF THE INVENTION

1. Field of the Invention

The present invention relates to a network defense system. More specifically, it relates to a deployable network defense system that monitors both network and operational activities, and predicts the mission impact of alterations and disruptions of networked resources.

2. Description of the Related Art

In both the commercial and military domains, systems are becoming increasingly networked. The power of networking is apparent through the potential for increased quantity and quality of information available for decision-makers and more efficient use of resources. At the same time, the increased complexity of networked approaches leads to several pressing needs. Some of these needs include robust systems, both to internal faults and to attacks from outside the network, as well as analysis to understand the impact of the system's degradation to its overall mission effectiveness.

SUMMARY OF THE INVENTION

The Mission Centric Network Defense System (MCNDS) is related to a deployable network defense system that monitors network activities, generates and maintains situational awareness of operational activities, and uses this joint situational awareness of networked and operational activities to predict the mission impact of alterations and disruptions of networked resources. The MCNDS uses predictive capability to rank defensive information operation (IO) courses-of-action (COAs) as well as interpret network alarms and intrusion detections in terms of expected operational mission impact. IO and operational commanders may use MCNDS to monitor and understand how their networks are supporting various missions and how actions taken on their networks impact their missions.

It is an object of the invention disclosed herein to provide dynamic, constantly maintained awareness of the actual current status of both the network and the mission.

It is a further object of the invention disclosed herein to use awareness of the actual current state of both the network and the mission to predict the mission impact of alterations and disruptions of networked resources, in general, and to provide mission relevant correlations of network alarms and intrusion detections in particular.

It is yet another object of the invention disclosed herein to predict the mission impact of network perturbations in general, and in one embodiment particular, to prioritize defensive information operation (IO) courses-of-action (COAs) with respect to expected impact on operational effectiveness.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION OF EXEMPLARY EMBODIMENTS

Figure 1:
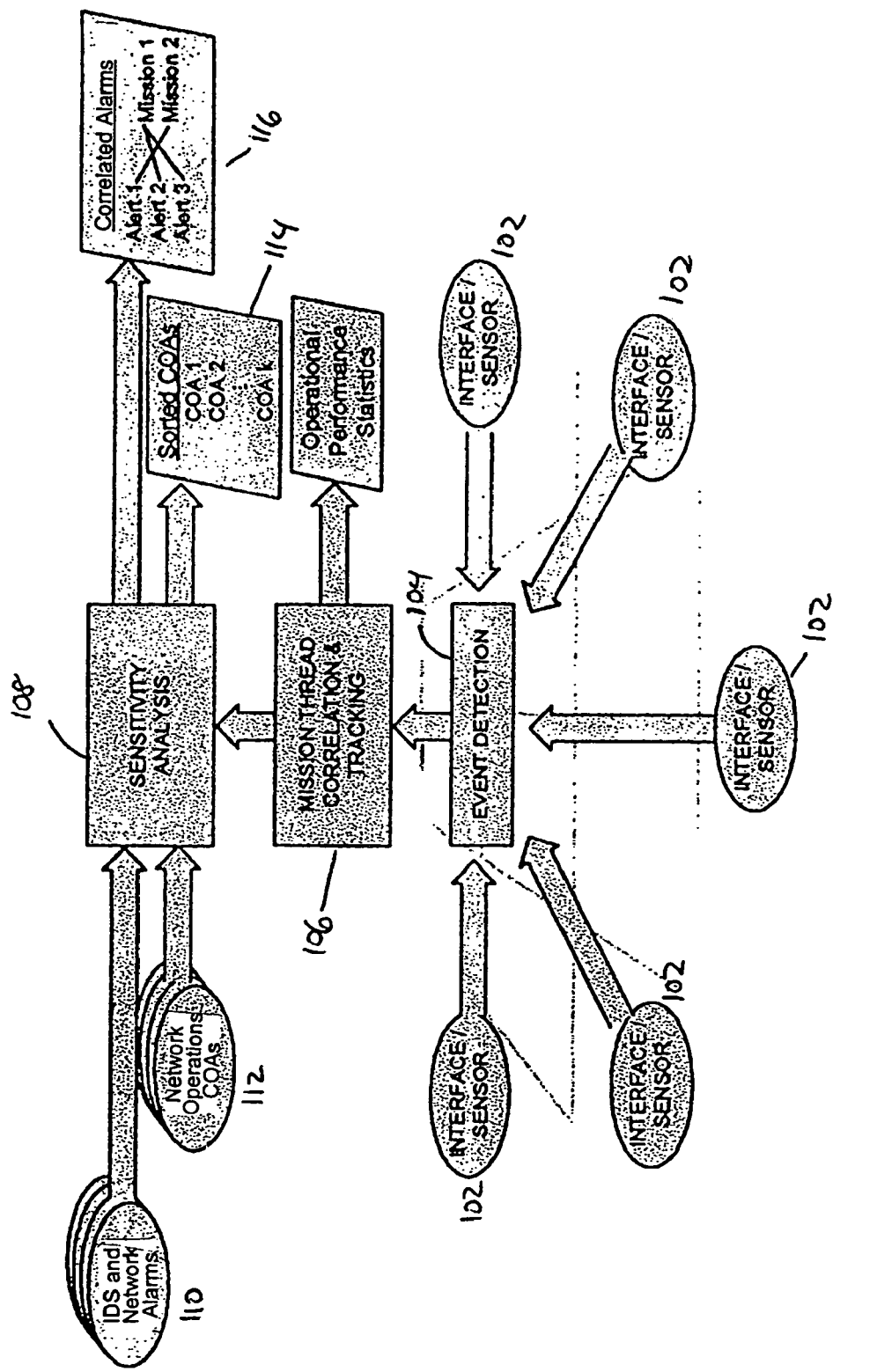
FIG. 1 is a block diagram depicting an embodiment of the functional architecture of the MCNDS.

FIG. 1 depicts an embodiment for the MCNDS. Interface sensors 102 at select network node(s) can provide both network and mission data. Both network health and the operational situation being supported by the network are monitored by extracting relevant information from packet and traffic patterns. Relevant information can include packet sources, destinations and ports, but can also include any other information deemed relevant to the network or mission. In this case, the packet flows may be scanned as an unstructured data stream.

Mission event detection 104 is performed by combining the information from the interface sensors. Once the mission events are detected, they are combined with knowledge of the mission types, and missions can be correlated and tracked 106. Mission tracking in the current context means determining which missions are active and the state of each mission. For this, a set of mission types is assumed (e.g. Call-For-Fire, TCS, Ship-To-Objective-Maneuver, Air Defense). Missions may be modeled using stochastic models (e.g., Hidden Markov Models, HMMs), that is, processes that have both stochastic transition behavior and stochastic output maps. Given the observed event sequence, the process of determining which mission types, with high probability, would most likely have generated the event may be performed inductively. For Hidden Markov Models, a fast algorithm that successful implements the induction is known as the "forward algorithm".

The forward algorithm can process the sequence of observed variables $o_1, o_2, \ldots, o_t$ using the model for each mission type k given by the data $M^k \equiv (A^k, C^k, \pi_0^k)$. These are the state transition matrix, the observation matrix, and the initial probability vector for mission k. The forward variable at time t for mission k is denoted by $\alpha_t^k$, and is the joint probability of a given sequence of observations and a particular state given model $M^k$. The i-th component is given by $$\alpha_t^k(i) = Pr(O_1 = o_1, O_2 = o_2, \ldots, O_t = o_t, s_t = i | M^k),$$

and the inductive procedure for computing $\alpha_t^k$ is as follows:

$$\alpha_1^k = \pi_0(i) c_{e_i i}^k, \forall i$$

$$\alpha_{t+1}^k(i) = \left( \sum_j \alpha_t^k(j) a_{ij}^k \right) \cdot c_{o_{t+1} i}^k,$$

where $a_{ij}^k$ is the ij-th entry of $A^k$ and $C_{o_{t+1}^{k}}^{i}$ is the $o_{t+1}, i^{th}$ entry of $C^k$. Once the forward variable has been computed, we have $$\Pr(O_1 = o_1, O_2 = o_2, \cdots, O_t = o_t, | M^k) = \sum_j \alpha_t^k(j),$$

where t is the terminal time, and this indicates the probability that mission k is active given the sequence of observed variables. A primary architectural product that has successfully been shown to allow effective mission tracking using HMMs is an operational sequence diagram (OSD) that describes which operational enterprise systems are communicating with each other, when, and in what order.

Sensitivity analysis 108 is then performed. The impact of network perturbations, e.g. intrusion detections 110, on the mission may be estimated, and correlated intrusions and alarms 116 can be determined. Mission sensitivity to various network perturbations may also be determined. One particularly important type of network perturbation is the implementation of an alternative network-operations COA 112. In this case, COAs may be prioritized 114 according to their contribution to overall mission performance.

Figure 2:
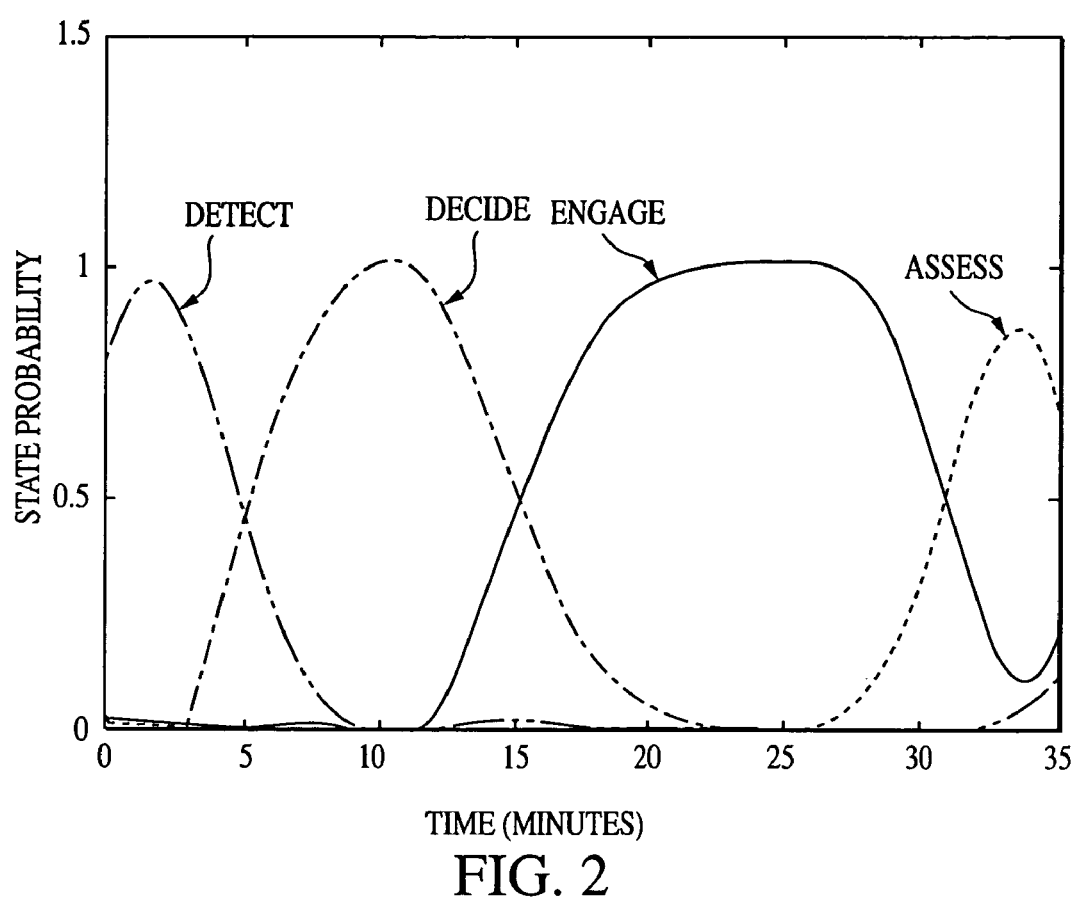
FIG. 2 is a graph showing an example mission state probability over time.

FIG. 2 depicts an approach to determining the mission state. In this example, the mission states are categorized as detect, decide, engage, and assess. A sample realization of observed events is generated and passed into the Hidden Markov Model (HMM) tracker. The probability vectors generated from the tracker vary over time and are shown in FIG. 2. During operations, the state probability vector for the current time is passed to the sensitivity analyzer as the initial condition used to start its analysis.

Figure 3:
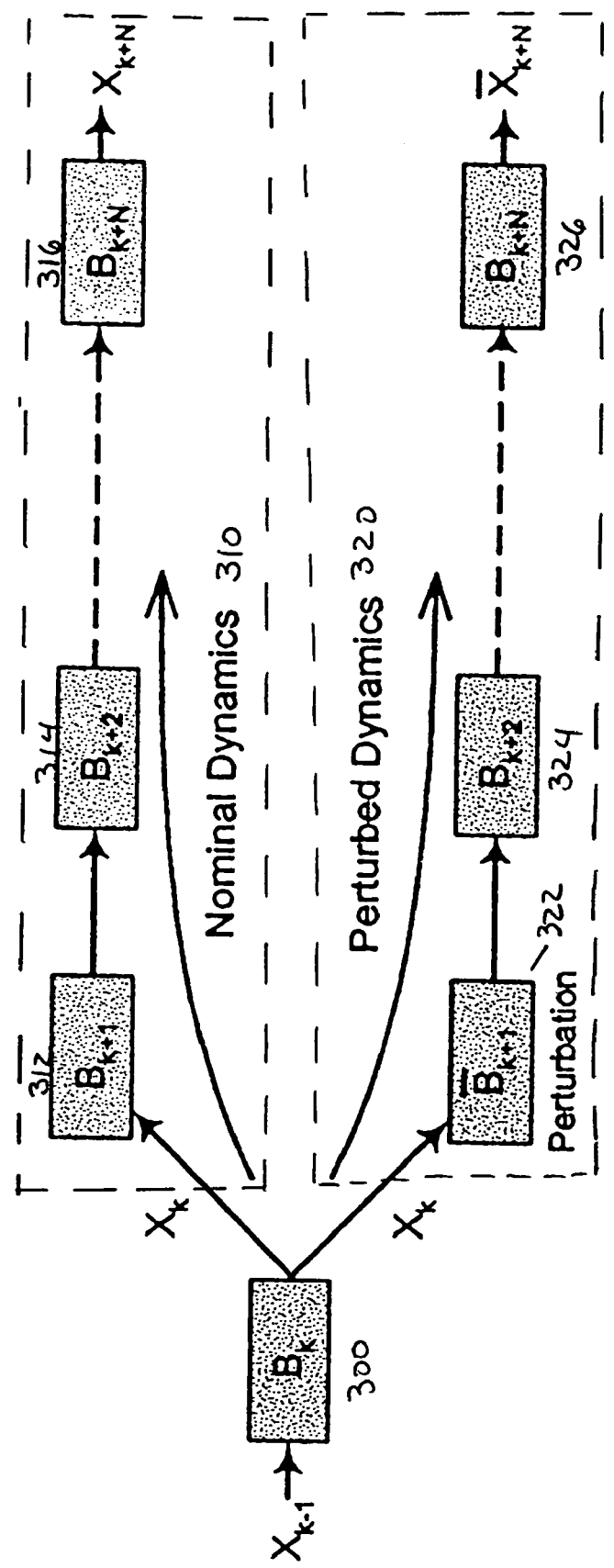
FIG. 3 depicts a method of determining mission sensitivity and performing mission impact prediction.

FIG. 3 depicts a method of determining mission sensitivity and performing mission impact prediction. The inputs are the mathematical objects provided by the network operational awareness function of the MCNDS. Given a mathematical model such as an HMM, the basic approach to sensitivity analysis is shown. The process is to take the state of the system at time increment k (300) and to produce two descendents. The first descendent 312 is the nominal version for time increment k+1, and the second descendent 314 is a perturbed (due to attack, failure, or reallocation) version for time. increment k+1. Both versions are then propagated forward in time, using nominal dynamics models out to some computation horizon, N. The difference between the overall mission effectiveness along both paths, the nominal path 310 and the perturbed path 320, is computed resulting in a sensitivity estimate. The estimate of mission sensitivity is with respect to the specific perturbation and the specific time at which the perturbation is injected into the path. By varying the system that is perturbed and the time at which the perturbation occurs, a more complete estimate of mission sensitivity is constructed.

Figure 4:
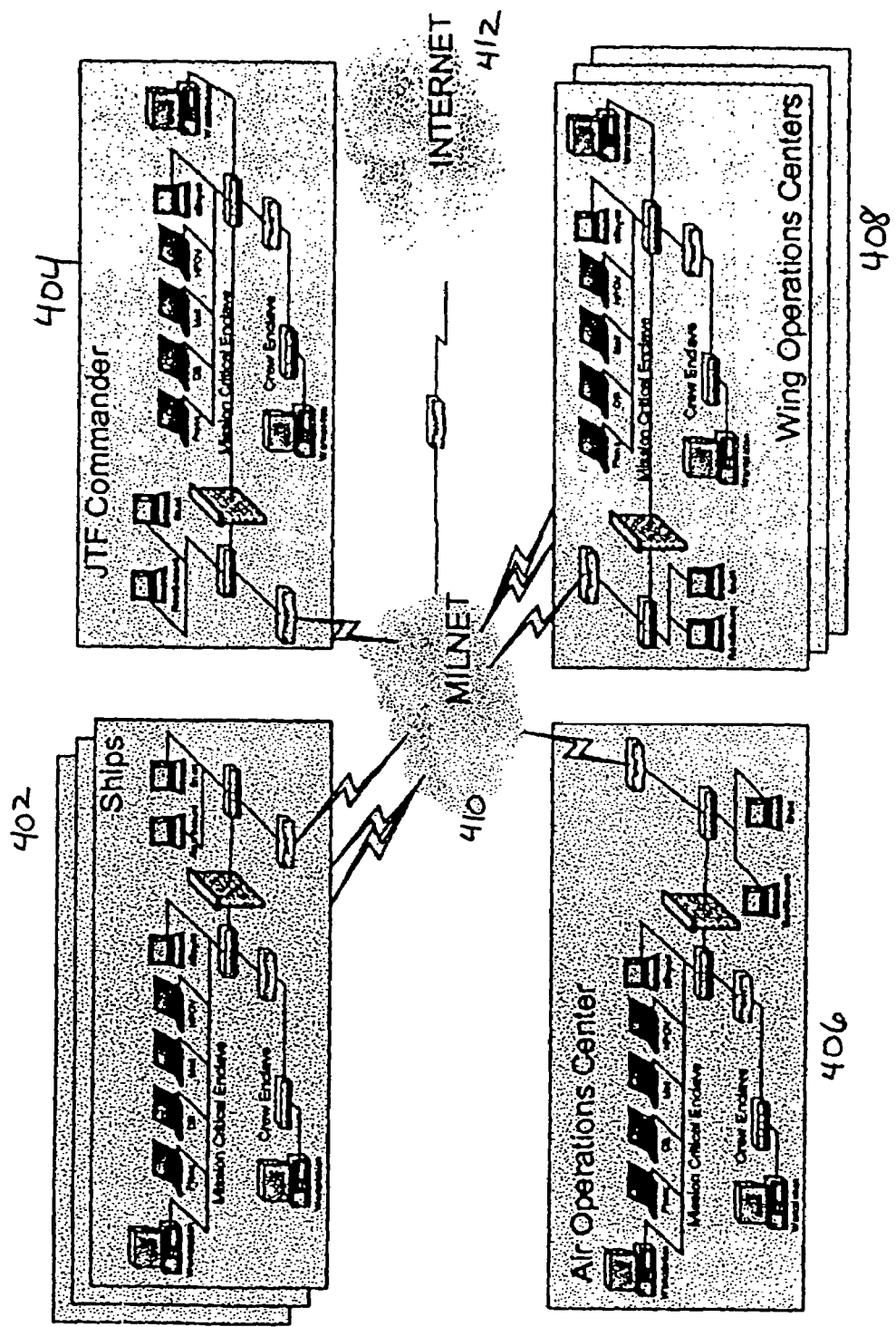
FIG. 4 depicts an example of a deployed force architecture with an Air Tasking Order (ATO) generation mission.

FIG. 4 depicts an example embodiment of a deployed force that must deal with IO attacks during a specific mission, Air Tasking Order generation. Coordination is required between the ships 402, the JTF Commander 404, the Air Operations Center 410, and the Wing Operations Center 408. Communications networks included MILNET 410 and internet 412. Compromises were considered in three components: an email server, a planning database server, and a domain name server.

Figure 5:
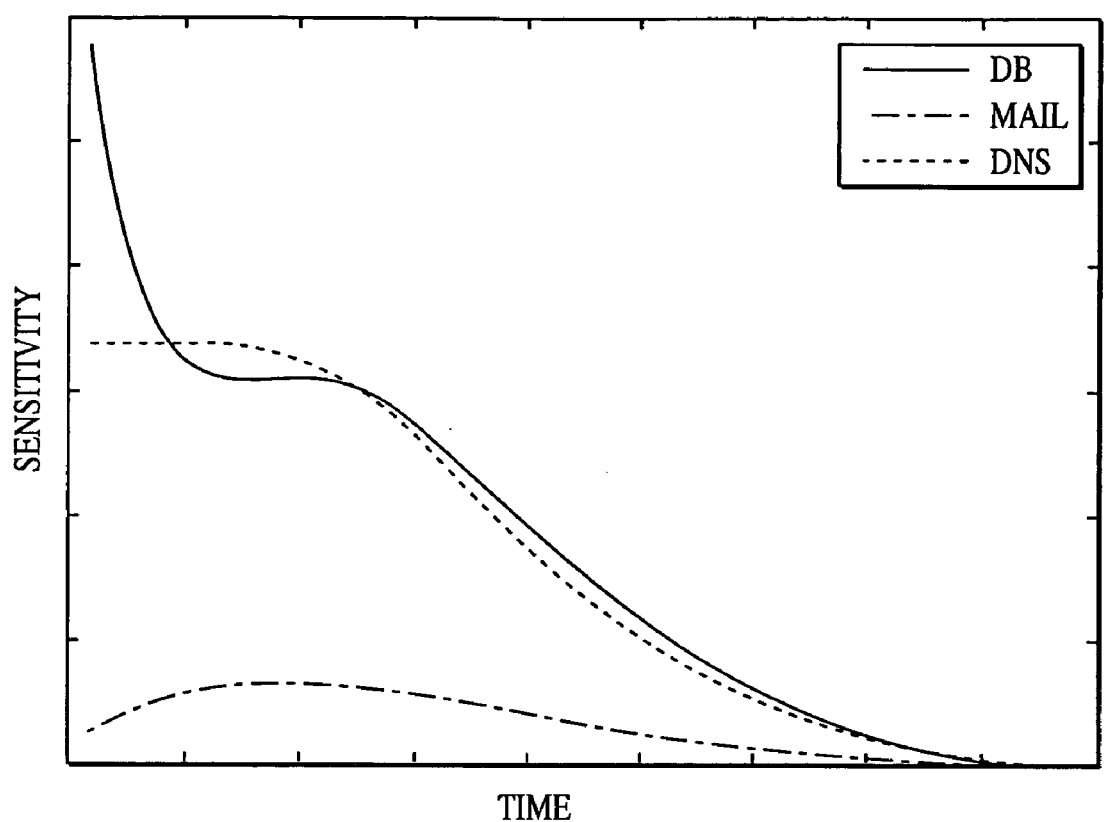
FIG. 5. is a graph illustrating an example set of sensitivity curves over time for the ATO generation mission.

Performing sensitivity analysis on the ATO generation mission results in the curves shown in FIG. 5. As can be easily seen in FIG. 5, mission sensitivity can vary greatly depending on which network components are compromised, and at what point in time they are impacted. This underscores the need to understand the mission sensitivities in order to make appropriate decisions and undertake the best courses of action.

In one embodiment of the present invention in a Naval scenario, the Naval operations (N3) user at the Tactical Flag Command Center (TFCC) will have available the MCNDS Command and Control (C2) Module to monitor which operational alternatives are at risk due to network perturbations. At the Network Operations Center (NOC) Naval networking users will have in the present embodiment the MCNDS C2 module for monitoring the network and planning network operations while interacting with the Naval Network Warfare Command (NNWC) and users at a Department of Defense Regional Network Operations and Security Center (RNOSC). An additional component of coordination may come from the Fleet Information Warfare Center (FIWC) to the NOC and the battlegroup N3. A team of users at FIWC will have in the present embodiment the MCNDS C2 module for monitoring, prioritizing network operation COIs, and planning the execution of network operations. MCNDS C2 modules will interface to collaboration tools to provide instant access between the battlegroup information warfare commander (IWC) and electronic warfare officer (EWO), and MCNDS users at the FIWC, NOC, NNWC and RNOSC.

Although the method according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A method for network defense, comprising the steps of:
detecting mission events by processing communications packets and traffic streams;
forming mission tracks by processing said mission events, determining active mission types, using said mission events;
determining state of each mission, using said mission events, including producing a mission state vector for each mission;
estimating mission sensitivities by processing said mission tracks;
prioritizing network operations by processing said mission sensitivities; and
correlating network alarms to missions by processing said mission sensitivities,
wherein said steps include a database of dynamic and a priori information,
wherein estimating mission sensitivities by processing said missiontracks
comprises estimating mission sensitivity to network perturbations, using mission tracks;
using a system dynamics model and a set of network perturbations to produce a nominal version of the mission state at k+1 and a perturbed version of the mission state at k+1, by injecting the perturbed version with the set of network perturbations at a predetermined time;
propagating out the nominal version of the mission state at k+1 and the perturbed version of the mission state at k+1, to a computation horizon; and
computing the difference between the overall mission effectiveness along the nominal version of the mission state and the perturbed version of the mission state;

predicting mission impact of network perturbations and implementation of a network-operations Course Of Action (COA) with respect to expected impact on operational effectiveness.

2. The method of claim 1, wherein prioritizing network operations by processing said mission sensitivities comprises ordering said list of network operations by comparing said mission sensitivities.

3. The method of claim 1, wherein said correlating network alarms to missions by processing said mission sensitivities comprising creating a list of relationships between each network alarm and each mission using said mission sensitivity values.

4. The method of claim 1, wherein network perturbations comprise modifications to network devices, protocols, policies, or architecture through network management courses of actions.

5. The method of claim 1, wherein network perturbations comprise modifications to network devices, protocols, policies, or architecture through attacks on network devices, protocols, policies, or architecture.

6. The method of claim 1, wherein the active mission types are determined through the use of a HMM.

7. The method of claim 1, wherein the state of each mission is determined through the use of a HMM.

8. The method of claim 6, wherein mission HMM component determination comprises combining performance statistics from earlier missions with an Operational Sequence Diagram.

9. The method of claim 7, wherein mission HMM component determination comprises combining performance statistics from earlier missions with an Operational Sequence Diagram.

10. The method of claim 1, wherein the step of determining said active mission types is performed inductively.

11. The method of claim 10, wherein the step of determining said active mission types inductively, is through the use of a forward algorithm.

12. The method of claim 1, wherein said estimating mission sensitivity to network perturbations comprises using a closed-form expression to compute mission sensitivities.

13. The method of claim 1, wherein said set of network perturbations comprises a set of alternative network operation COAs.

14. The method of claim 1, wherein said set of network perturbations comprises a set of attacks on network devices, protocols, policies, and architecture.

15. The method of claim 12, wherein said set of network perturbations comprises a set of alternative network operation COAs.

16. The method of claim 12, wherein said set of network perturbations comprises a set of attacks on network devices, protocols, policies, and architecture.

\* \* \* \* \*